United States Patent [19]

Fehrm

[11] 4,417,709
[45] Nov. 29, 1983

[54] SPREADING DEVICE

[75] Inventor: Björn O. Fehrm, Järfälla, Sweden

[73] Assignee: U.S. Philips Corporation, New York, N.Y.

[21] Appl. No.: 244,542

[22] Filed: Mar. 17, 1981

[30] Foreign Application Priority Data

Mar. 17, 1980 [SE] Sweden .............................. 8002058
Sep. 26, 1980 [SE] Sweden .............................. 8006725

[51] Int. Cl.³ .............................................. B64D 1/16
[52] U.S. Cl. ................................ 244/136; 244/137 R; 89/1.5 C; 89/1.819; 102/505
[58] Field of Search ..................... 244/136, 137 R; 343/18 E, 18 B; 102/505; 89/1.5 C, 1.819

[56] References Cited

U.S. PATENT DOCUMENTS

| 2,940,362 | 6/1960 | Paxton ................................ 89/1.819 |
| 2,955,787 | 10/1960 | Ray et al. .......................... 244/135 R |
| 2,960,294 | 11/1960 | Johnson et al. ................... 244/135 R |
| 3,276,317 | 10/1966 | Kossan et al. ..................... 89/1.819 |
| 3,898,661 | 8/1975 | Kelley et al. ....................... 102/505 |
| 4,309,705 | 1/1982 | Ulin ................................... 102/505 |

Primary Examiner—Galen L. Barefoot
Assistant Examiner—Ivy M. Shum
Attorney, Agent, or Firm—Robert J. Kraus

[57] ABSTRACT

A radar chaff spreading device for mounting on an airplane equipment support beam. The device includes attachment means from which additional equipment, such as a missile, can be suspended. The chaff spreading device further includes coupling means for receiving power and control signals from the airplane and for transmitting control signals to the additional equipment.

7 Claims, 6 Drawing Figures

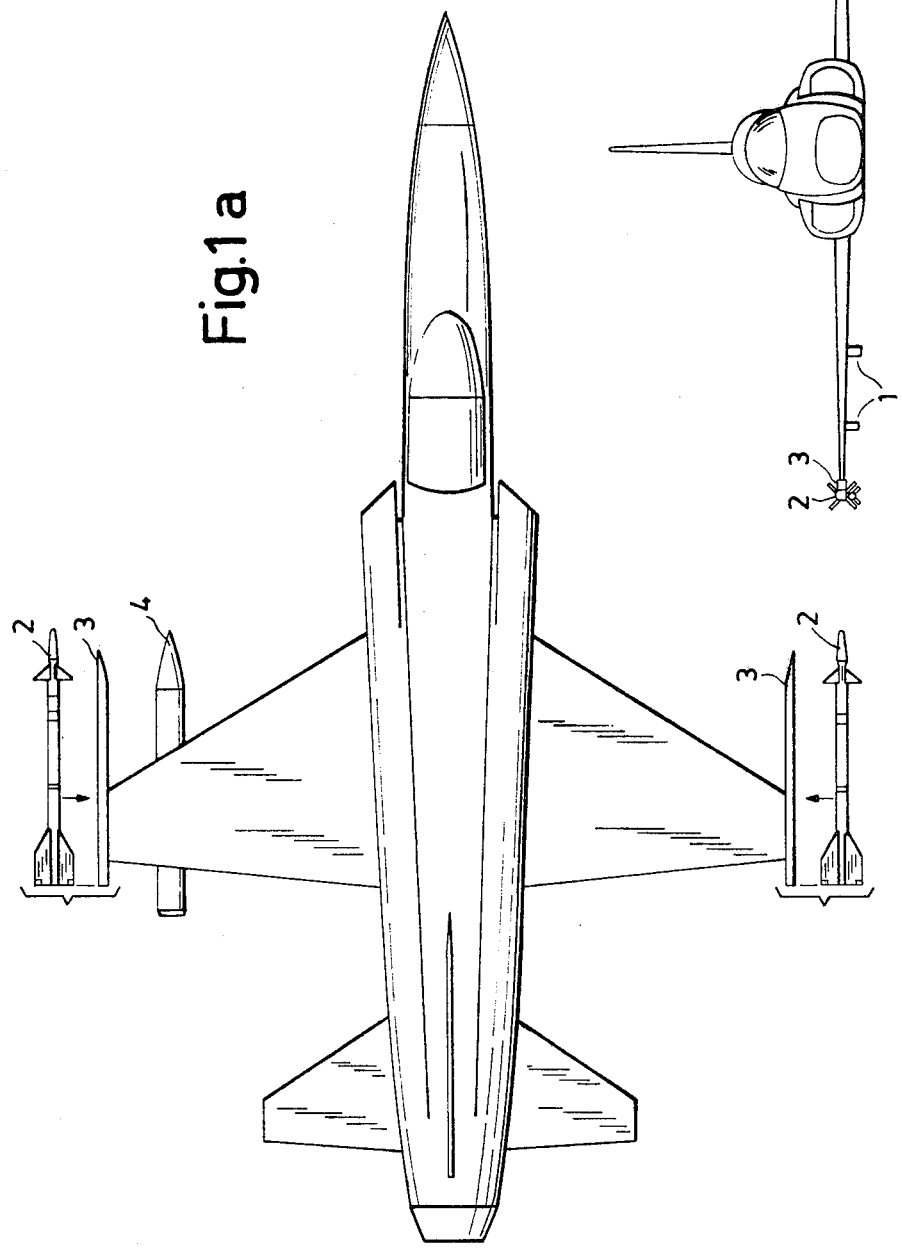

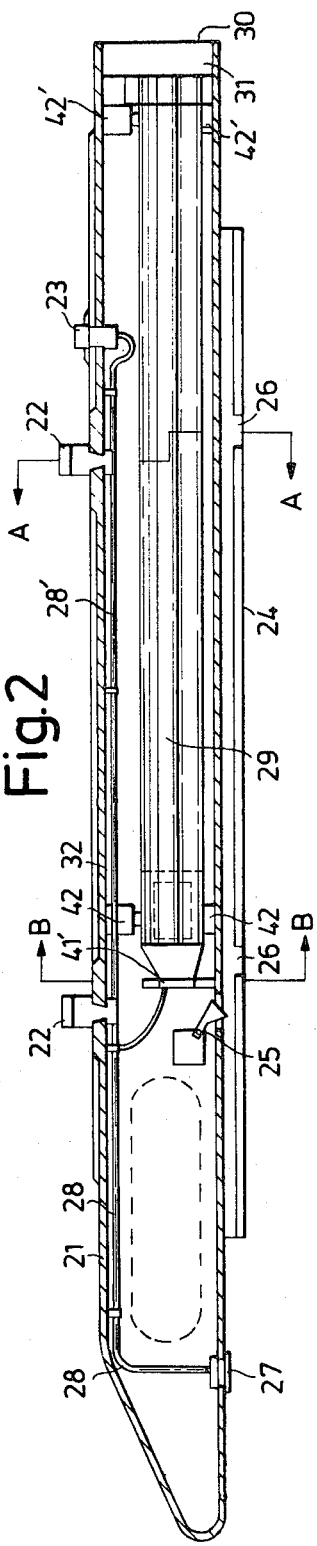
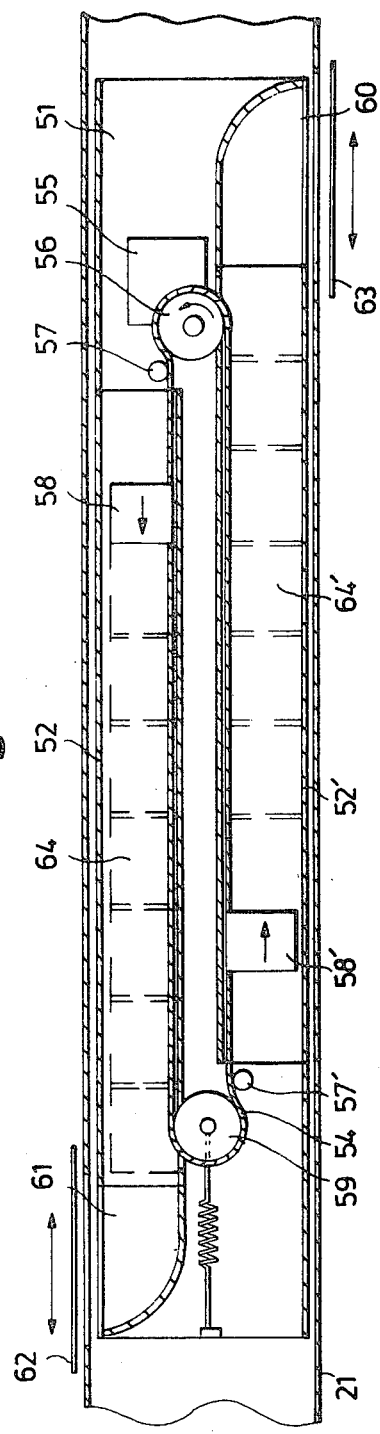

SPREADING DEVICE

BACKGROUND OF THE INVENTION

The invention is directed to a device for spreading radar chaff from airplanes, comprising a magazine for holding chaff bundles which can be displaced towards an ejection opening by means of a controllable displacement member. The chaff is ejected into the surrounding air stream and spread by air turbulence.

In the following description the word chaff will be used as a designation of the radar interference means used and should be considered to include the usual metal foil strips as well as corresponding means, e.g. metal covered glass fibers.

Devices of the type mentioned above are known and are used for forming chaff clouds. A chaff cloud of this type may consist of a very large number of strips supplied by the bundles and forming dipoles of predetermined lengths. Dependent on the lengths of the dipoles, frequency bands which are used for radar reconnaissance, homing missiles and corresponding objects will be interfered with.

Prior art devices for spreading radar chaff usually have one of three different forms of construction. In the first form the spreading device is capsule shaped and attached to one of the beams or other weapon support means on the airplane. In the second form the spreading device is attached to the outer shell of the airplane body. In the third form the spreading device is contained within the airplane body.

These three forms of construction have different advantages and drawbacks. The two last mentioned forms require modification of the airplane body. If the spreading device is mounted on the shell of the airplane, the weight and dimensions thereof, and thereby its chaff capacity, will have to be limited in order to avoid extensive constructional reinforcements of the associated parts of the airplane body. The device might also disturb aerodynamic flow around the airplane body, adversely affecting chaff spreading. The last mentioned drawback also applies to the third form which has the further drawback that special space must be allocated within the airplane body. Normally no such space is available in an existing airplane, but will have to be planned during development of the airplane.

The capsule-shaped device which attaches to weapon support means effectively spreads chaff, has a large chaff capacity, and can be attached to existing support means. The drawbacks of such a device are that it will occupy a position on the airplane which could otherwise be used for attaching weapons and it has a relatively high air resistance and weight. A spreading device of this type is known from Swedish patent application No. 7606167-0 corresponding to U.S. Pat. No. 4,134,115.

SUMMARY OF THE INVENTION

An object of the invention is to provide a capsular chaff spreading device having the advantages but not the disadvantages of the above-described prior art devices.

In accordance with the invention, the device comprises an aerodynamically shaped cover which can be attached to a wing or the body of an airplane. The cover encloses a magazine and displacement means including a driving device for the chaff bundles. A first side of the cover, directed towards the airplane, is provided with attachment means, and with a coupling member which may be electrical, optical or pneumatic. The attachment means and coupling member are adapted for cooperation with corresponding elements on the airplane. The coupling member receives from equipment in the airplane supply current and control signals for transmission to the driving device and to a missile or other equipment which can be suspended from a second side of the cover. The second side includes attachment means and a contact member for cooperation with corresponding means and member provided on the missile or other suspended equipment. Transfer means connect the cover's coupling member and contact member. Thus the cover provides mechanical and electrical connection between the airplane and equipment or weapons carried thereby.

Because a chaff spreading device according to the invention can be used as a carrier for other equipment, no carrier position on the airplane need be dedicated to chaff spreading only. The carrier positions of attack, fighter and reconnaissance airplanes, are normally shaped in accordance with an accepted standard, having standardized attachment means and coupling members. Equipment carried by the airplane are also provided with standardized attachment means and coupling members. However, differences between these two standards sometimes exist, necessitating a mechanical and/or electrical adaptation between the airplane and the equipment carried thereby. The attachment means and the coupling members of the chaff spreading device can be used to perform this adaptation, thereby increasing its usefulness.

Because the spreading device according to the invention does not monopolize a carrier position on the airplane, it is possible to use a number of the devices. The spreading devices may then be arranged symmetrically on the airplane, thereby eliminating assymmetry problems which are normally experienced when a prior art capsular unit is carried in only one position on the airplane because of space limitations. By using several spreading devices, more effective spreading is achieved and the available chaff is better utilized. The use of several devices also decreases the period of time needed to form a chaff cloud having a desired area and shape. This decreases the total amount of chaff needed to produce a desired chaff cloud. The total weight of two spreading devices containing the decreased amount of chaff will not substantially deviate from the weight of a prior art capsular unit having a corresponding chaff spreading capacity.

Normally the airplanes in question are armed with a hunting or fighter missile which may be a homing type. For firing a missile of this type a rail or beam is used along which cooperating hanging means of the missile will slide when the missile is fired. In connection with the rail, an electrically-operable mechanism is provided for temporarily locking the missile to the rail until firing. Furthermore, a conductor joint is provided for connection to the missile. According to one preferred embodiment of the device according to the invention the further attachment means and contact members thereof comprise a rail having a locking mechanism and an electric conductor joint of the type mentioned.

One commonly used missile is a hunting missile of IR homing type comprising an IR element which must be cooled when in an activated state as long as the missile is on the airplane. One commonly used position of a hunting missile is at the very end of the airplane wing tips. By using two spreading devices as carriers for these hunting missiles attached at the ends of the wing tips, optimal chaff spreading is accomplished because of the turbulent air streams appearing at the wing tips and because the spreading devices will be separated by the maximum possible distance. This enables minimization of the amount of chaff and thereby the weight of the chaff spreading devices. The torsional stiffness of airplane wings is limited and must not be exceeded by handing loads. When using a spreading device at the wing tip, this loading may give rise to problems if a large amount of chaff is desired because the center of gravity will be displaced when the chaff bundles, which are contained in the device, are displaced towards the ejection opening. This problem has been eliminated in one embodiment of the spreading device according to the invention by distributing the weight thereof in such a manner that its center of gravity lies in the front part of the device and remains substantially stationary when the chaff is ejected. Such a weight distribution can be obtained by providing in a front end space of the device a ballast preferably in the form of a container for cooling gas. This cooling gas is used for cooling IR-elements present in a hunting missile carried by the airplane. Due to the ballast which has a larger weight than the chaff, the center of gravity of the whole device will not change significantly when the chaff is ejected.

In order to keep the center of gravity practically stationary in a further embodiment, the magazine comprises at least one pair of cells in which chaff is displaceable in opposite directions.

By distributing the weight in the manner described above it is ensured that the torsional forces on the wings are small and that a released device will drop without turning over thereby damaging the airplane.

BRIEF DESCRIPTION OF THE DRAWING

The invention will be described in detail in connection with preferred embodiments and with reference to the drawing, in which:

FIGS. 1a and 1b show top and frontal views of an airplane to which chaff spreading devices are attached;

FIG. 2 shows an embodiment of the device according to the invention;

FIG. 5 shows another embodiment of the spreading device according to the invention.

DESCRIPTION OF THE PREFERRED EMBODIMENTS

Figure 3:
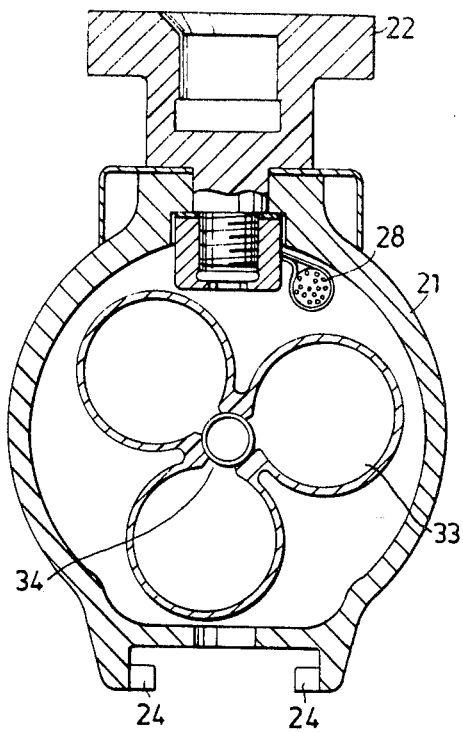
FIG. 3 shows a section A—A of the device illustrated in FIG. 2.

The airplane in FIGS. 1a and 1b is provided with a number of beams 1 under the wings. At the ends of the wing tips, two hunting missiles 2 are attached via spreading devices 3 which, according to the invention, provide mechanical and electrical connections between the missile and the airplane. On one of the left beams, a prior art capsular chaff spreading device 4 is shown. As evident from the drawing the dimension of the capsular unit 4 is quite different from that of the devices 3, and this also gives a clear illustration of the assymmetry problems with respect to weight and air resistance which are encountered when a prior art capsular unit is used. Each of the spreading devices 3 is smaller and weighs less than the prior art capsular unit. The smaller amount of chaff carried by devices 3 can be compensated for by locating them at the wingtips where optimal use is made of the chaff. When a larger chaff capacity is required additional spreading devices can be attached at other beam positions. These additional spreading devices may also be provided with attachment means and contact members in order to provide mechanical and electrical connections to other units carried by the airplane. The construction of the spreading device 3 will now be described in more detail.

In FIG. 2 is shown a sectional view of one embodiment of the spreading device 3 of FIG. 1, intended for placement between an airplane and a homing missile, for which the spreading device will function as a launching means. The device comprises an aerodynamically-shaped outer cover 21. On the top side of the cover two attachment means 22 are provided, which are normally T-shaped (see FIG. 3) for insertion into corresponding recesses of attachment means on the airplane. At the tail-end, a coupling member 23 is provided for coupling to a corresponding member on the airplane to make connections to equipment within the airplane by way of transfer means. Conductors 28', connected to the coupling member, provides power to the spreading device. Electrical or pneumatic conductors can be used, depending on the type of driving device which is used for driving forward the chaff bundles. Other conductors for transmission of control signals from equipment in the airplane may comprise electrical or optical members.

On the other side of the cover is provided an attachment means 24, which in this embodiment is shaped as a beam or rail along which corresponding suspension members of the missile will slide at firing. The detailed shape of the rail is shown in FIG. 3. A locking member 25 is provided for temporarily locking the missile to the rail. Member 25 is electrically operable. Along the rail, two openings 26 are provided through which the normally T-shaped suspension members of the missile may be inserted. The missile is pushed forward along the rail until the locking member 25 is latched. In front of the rail 24, contact member 27 is provided for transmission of control signals to a suspended missile. The contact member includes transfer means and a connector arranged behind a lid.

Between contact member 27 and coupling member 23, transfer means 28 are provided for the transmission of electrical, optical and/or pneumatic signals to the missile from equipment in the airplane.

Since the detailed shape of the attachment means, coupling member and contact member is not necessary for understanding the invention, a detailed description thereof has been omitted. The external shape of the cover, the configurations of the coupling and contact members, as well as the attachment means, and the mutual positions thereof are adapted to the plane and the equipment suspended from the device. Thereby a chaff spreading device with a large range of applications is obtained.

Within the cover, a magazine 29 is accommodated comprising one or more longitudinal cells (see FIGS. 3,4) in which chaff bundles can be displaced towards a spreading device ejection opening 30 which is closed by means of closing member 31 which is controlled from the airplane. In the front end of the magazine a driving device 32 is provided, which may comprise an electric motor, for driving a bundle displacement member. The front end of the chaff spreading device has available space which, when intended for attachment between an airplane and a hunting missile of an IR homing type having an IR element which must be cooled, can accommodate a container with a cooling gas which is indicated by means of dotted lines.

In FIG. 3 is shown a section A—A of the device of FIG. 2. This section shows the detailed shape of the attachment means 22 and 24. The attachment means 22 are T-shaped and the attachment means or rail 24 has an internal T-shape. The transfer means 28 are provided along the upper wall of the cover. The magazine 29 comprises three longitudinal and cylinder-shaped cells 33 in which chaff bundles of an external diameter which substantially corresponds to the internal diameter of said cells may be displaced. This displacement is obtained by a bundle displacement member having three wings (not shown) which are each inserted into a respective cell via a longitudinal slot 34 from a common part of the displacement member, which is advanced by means of a centrally arranged screw. The screw is rotated by the driving device or motor 32. For a more detailed description of the magazine and the displacement device, refer to the above mentioned Swedish patent application No. 7606167-0 corresponding to U.S. Pat. No. 4,134,115.

The magazine and the displacement device which has been shown and described is only one possible embodiment. Some alternative embodiments are described in Swedish patent application Nos. 7812889-9 and 7901890-9 corresponding to U.S. Pat. Nos. 4,309,705 and 4,304,517, respectively.

Figure 4:
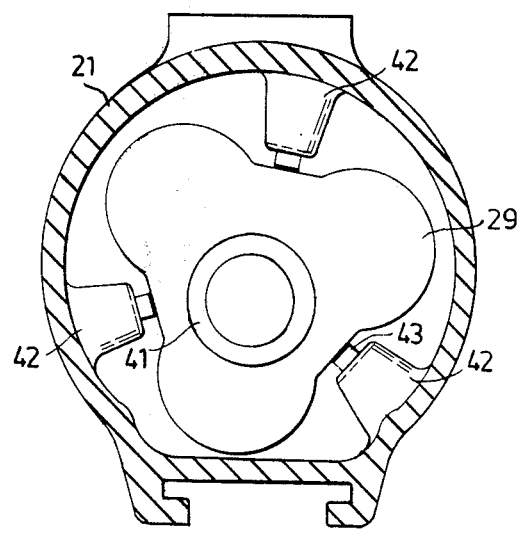
FIG. 4 shows section B—B of the device illustrated in FIG. 2.

In FIG. 4 is shown a sectional view B—B of the device in FIG. 2. This section is taken at the front part of the magazine 29 which is provided with a guiding device comprising in this embodiment a ring-shaped electrical contact member 41. When the magazine 29 is inserted into the cover 21, contact member 41 is brought into contact with a corresponding stationary contact member 41' (see FIG. 2) in the cover, which in turn is connected to coupling member 23, enabling the driving motor to be supplied with driving current. The shape of at least the front part of the magazine has been modified by filling out the external spaces between the walls of cells 33 to form surfaces, sloping towards the contact member 41, which in cooperation with guiding elements 42 on the inside of the cover guide the front end of the magazine into a predetermined position on cover 21. Guiding elements 42 preferably comprise resilient contact elements 43, which are pressed against the magazine. The rear part of the magazine may be kept in position by corresponding elements 42' (see FIG. 2) positioned near the ejection opening.

FIG. 5 shows a further embodiment of a magazine 51 for use in the spreading device according to the invention. This magazine 51 comprises two longitudinal cells 52,52' in which chaff bundles may be displaced by means of plunger devices 58, 58'. The plunger devices are advanced in opposite directions by means of a wire 54 and a driving motor 55 which is arranged so as to drive a driving wheel 56 from which wire 54 runs via a tension roller 57 to the plunger device 58 and from this point along the inside of cell 52 to a spring loaded conducting roller 59 and via a second tension roller 57' to the plunger device 58' and from this point along the inside of cell 52' back to the driving wheel 56. At the output ends of the cells, means (not shown) are provided for separation of the chaff from the bundles, which normally means that a paper cover enclosing the bundles is cut or ripped. Such cutting means can for example comprise a rotatable knife member inserted into the cell and rotatable by means of wire 54. A knife member of this type has been disclosed in the above mentioned Swedish patent application No. 7901890-0 corresponding to U.S. Pat. No. 4,304,517. The output end of each cell terminates in an ejection opening 60 and 61, respectively, communicating with corresponding openings in the cover 51 covered by closing devices 62, 63.

When the driving motor 55 is activated, the chaff bundles 64, 64' in cells 52, 52', will be displaced in opposite directions by the plunger devices 58, 58'. Thus the center of gravity of the spreading device will be kept substantially unchanged, which minimizes the necessary torsional stiffness of airplane wings which must support the chaff load. This is especially important when the spreading devices are mounted at the ends of the airplane wings as shown in FIG. 1.

The weight distribution of the device is such that the center of gravity lies in the front part of the device and remains there when the chaff is discharged. This weight distribution is important when the device has to be released from the airplane. It is important that the released device falls without tumbling and possibly damaging the airplane. By distributing the weight such that the device is noseheavy and remains noseheavy after discharging the chaff the device will remain in a stable position after release from the airplane.

I claim:

1. A chaff spreading device for attachment to equipment supporting means on an aircraft comprising:
    (a) an aerodynamically shaped cover having an ejection opening;
    (b) a magazine disposed within the cover for containing bundles of the chaff;
    (c) displacement means for moving bundles of the chaff toward the ejection opening;
    (d) a driving device for moving the displacement means;
    (e) first attachment means provided on a first side of the cover for attaching the chaff spreading device to the equipment supporting means on the airplane;
    (f) second attachment means provided on a second side of the cover for cooperating with suspension means of equipment to be suspended from the airplane, thereby supporting the equipment;
    (g) a coupling member provided on the first side of the cover for coupling with a corresponding member on the aircraft to receive power and control signals from the aircraft;
    (h) a contact member provided on the second side of the cover for coupling with a corresponding member on the equipment to be suspended, effecting transmission to the equipment of signals received from the aircraft; and
    (i) transfer means connecting the coupling member to the driving device and the contact member for providing received power and control signals to the driving device and the contact member.

2. A chaff spreading device as in claim 1 wherein said second attachment means comprises means for slidably supporting a missile and a locking mechanism which can be actuated from the airplane to release the missile.

3. A chaff spreading device as in claim 1 including means for maintaining the device's center of gravity in a frontal part of the device.

4. A chaff spreading device as in claim 3 wherein said frontal part of the device contains a ballast.

5. A chaff spreading device as in claim 3 wherein said magazine comprises a pair of cells terminating in separate ejection openings and means for simultaneously moving bundles of chaff contained in the cells in opposite directions toward said ejection openings.

6. A chaff spreading device as in claim 1 wherein the magazine comprises a self-supporting unit adapted for longitudinal insertion into the cover and where said device includes guiding elements for guiding the magazine into a predetermined position within the cover.

7. A chaff spreading device as in claim 6 wherein the driving device is contained within an end of the magazine remote from the ejection opening and where said magazine includes an electrical contact member for facilitating electrical connection with said transfer means.

* * * * *